United States Patent
Hsu

(10) Patent No.: US 12,003,095 B2
(45) Date of Patent: Jun. 4, 2024

(54) ABNORMALITY DETECTING SYSTEM FOR A SOLAR POWER GRID

(71) Applicant: LIXMA TECH CO., LTD., Taichung (TW)

(72) Inventor: Chun-Chi Hsu, Taichung (TW)

(73) Assignee: Lixma Tech Co., Ltd., Taichung (TW)

( * ) Notice: Subject to any disclaimer, the term of this patent is extended or adjusted under 35 U.S.C. 154(b) by 299 days.

(21) Appl. No.: 17/366,324

(22) Filed: Jul. 2, 2021

(65) Prior Publication Data

US 2022/0014015 A1    Jan. 13, 2022

(30) Foreign Application Priority Data

Jul. 8, 2020 (TW) ................................ 109123086
Nov. 23, 2020 (TW) ................................ 109140960

(51) Int. Cl.
 *H02H 7/122* (2006.01)
 *H02S 40/32* (2014.01)
 *H02S 50/10* (2014.01)

(52) U.S. Cl.
 CPC .......... *H02H 7/1227* (2013.01); *H02S 40/32* (2014.12); *H02S 50/10* (2014.12)

(58) Field of Classification Search
 CPC ........ H02H 7/1227; H02S 40/32; H02S 50/10
 See application file for complete search history.

(56) References Cited

U.S. PATENT DOCUMENTS

| | | | | |
|---|---|---|---|---|
| 5,712,572 A | * | 1/1998 | Tamechika | G01R 31/129 324/509 |
| 2001/0023703 A1 | * | 9/2001 | Kondo | H02S 50/10 136/291 |
| 2002/0085397 A1 | | 7/2002 | Suzui et al. | |
| 2012/0048326 A1 | * | 3/2012 | Matsuo | H02S 50/10 702/65 |
| 2013/0170084 A1 | * | 7/2013 | Strobl | G01R 31/69 361/79 |

(Continued)

FOREIGN PATENT DOCUMENTS

| CN | 106992540 B | 9/2019 |
|---|---|---|
| JP | H09327179 A | 12/1997 |

(Continued)

OTHER PUBLICATIONS

A Search Report, which was issued to European counterpart application No. 21183741.2 by the EPO on Dec. 10, 2021.

(Continued)

*Primary Examiner* — Sadie White
(74) *Attorney, Agent, or Firm* — Rosenberg, Klein & Lee

(57) ABSTRACT

A system is provided to be disposed between a solar power module and a power inverter. The solar power module outputs a solar power signal to the power inverter. The system includes a circuit protecting unit and a processor. The processor obtains an amount of electrical current outputted by the power inverter and an amount of electrical current flowing through a current detector of the circuit protecting unit. When it is determined that the amount of electrical current outputted by the power inverter is zero and the amount of the electrical current flowing through the current detector is non-zero, the processor controls a power switch of the circuit protecting unit to switch to an open circuit state.

14 Claims, 5 Drawing Sheets

(56) References Cited

U.S. PATENT DOCUMENTS

| | | | | |
|---|---|---|---|---|
| 2013/0194706 | A1* | 8/2013 | Har-Shai | H02H 3/16 |
| | | | | 361/42 |
| 2015/0309104 | A1* | 10/2015 | Möll | H02H 1/0015 |
| | | | | 324/537 |
| 2017/0288409 | A1* | 10/2017 | Yoscovich | H01R 25/00 |
| 2019/0074684 | A1* | 3/2019 | Craciun | H02H 7/20 |
| 2020/0021101 | A1 | 1/2020 | Giacolini et al. | |

FOREIGN PATENT DOCUMENTS

| | | | |
|---|---|---|---|
| JP | H10285807 | A | 10/1998 |
| JP | 2005168156 | A | 6/2005 |
| JP | 2016092881 | A | 5/2016 |
| KR | 20190044791 | A | 5/2019 |
| WO | 2004110659 | A2 | 12/2004 |

OTHER PUBLICATIONS

An Office Action, which was issued to Indian counterpart application No. 202114030038 by the Indian Patent Office on Mar. 17, 2022.

Office Action issued to Japanese counterpart application No. 2021112546 by the JPO on May 31, 2022.

Office Action issued to Korean counterpart application No. 1020210088660 by the KIPO on May 11, 2023.

* cited by examiner

ABNORMALITY DETECTING SYSTEM FOR A SOLAR POWER GRID

CROSS-REFERENCE TO RELATED APPLICATION

This application claims priority of Taiwanese Patent Application No. 109123086, filed on Jul. 8, 2020, and Taiwanese Patent Application No. 109140960, filed on Nov. 23, 2020.

FIELD

The disclosure relates to an abnormality detecting system for use with a solar power grid.

BACKGROUND

FIG. 1 illustrates a conventional solar power grid that includes a plurality of solar panel modules 11, a power inverter 12 that is electrically connected to the solar panel modules 11, a power distribution module 13 that is electrically connected to the power inverter 12, a plurality of first cable troughs 14 each disposed to cover a cable connecting a corresponding one of the solar panel modules 11 to the power inverter 12, and a second cable trough 15 disposed to cover a cable connecting the power inverter 12 to the power distribution module 13.

In use, the solar panel modules 11 are configured to convert sunlight into electricity, and to output the electricity to the power inverter 12 in the form of a direct current (DC) signal. The power inverter 12 is configured to receive the DC signal from the solar panel modules 11, and to convert the DC signal to a converted power signal in the form of an alternating current (AC) signal and to output the AC signal. The AC signal is then transmitted to the power distribution module 13 that is configured to distribute the AC signal to other parts of the conventional solar power grid.

It is noted that the cable used to connect the power inverter 12 to the power distribution module 13 and cables used to connect the power distribution module 13 to the other parts of the power grid are typically equipped with adequate power system protection mechanisms that assists in stabilizing the power grid when one or more components of the power grid become non-functional.

SUMMARY

One object of the disclosure is to provide an abnormality detecting system that can be installed between certain parts of a solar power grid to detect abnormality, and therefore perform necessary operations to prevent further damage to the solar power grid.

According to one embodiment of the disclosure, the abnormality detecting system is for a solar power grid. The abnormality detecting system is to be disposed between a solar power module and a power inverter of the solar power grid. The solar power module includes a solar panel, and a first output node and a second output node that cooperatively output a solar power signal in a form of a direct current signal. The power inverter is electrically connected to the solar power module to receive the solar power signal therefrom and being configured to convert the solar power signal to a converted power signal in a form of an alternating current (AC) signal and to output the converted power signal. The abnormality detecting system includes a circuit protecting unit and a processor.

The circuit protecting unit includes an input component including a first port and a second port that are configured to be electrically connected respectively to the first output node and the second output node, and being configured to receive the solar power signal from the solar power module through the first and second ports, a power switch electrically connected to the first port, an output component electrically connected between the power switch and the power inverter, a current detector electrically connected between the input component and the output component, and configured to measure an amount of electrical current flowing therethrough, and a control module electrically connected to the current detector and the power switch. The control module is capable of controlling the power switch to switch between an open circuit state in which the power switch disallows electrical current to flow therethrough, and a closed circuit state in which the power switch allows electrical current to flow therethrough.

The processor is electrically connected to the control module, is configured to be electrically connected to the power inverter, and that is configured to:

obtain an amount of electrical current of the converted power signal outputted by the power inverter, when the power switch is in the closed circuit state, obtain the amount of electrical current flowing through the current detector, and when it is determined that the amount of the converted power signal is zero and the amount of the electrical current flowing through the current detector is non-zero, controlling the control module to control the power switch to switch to the open circuit state.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
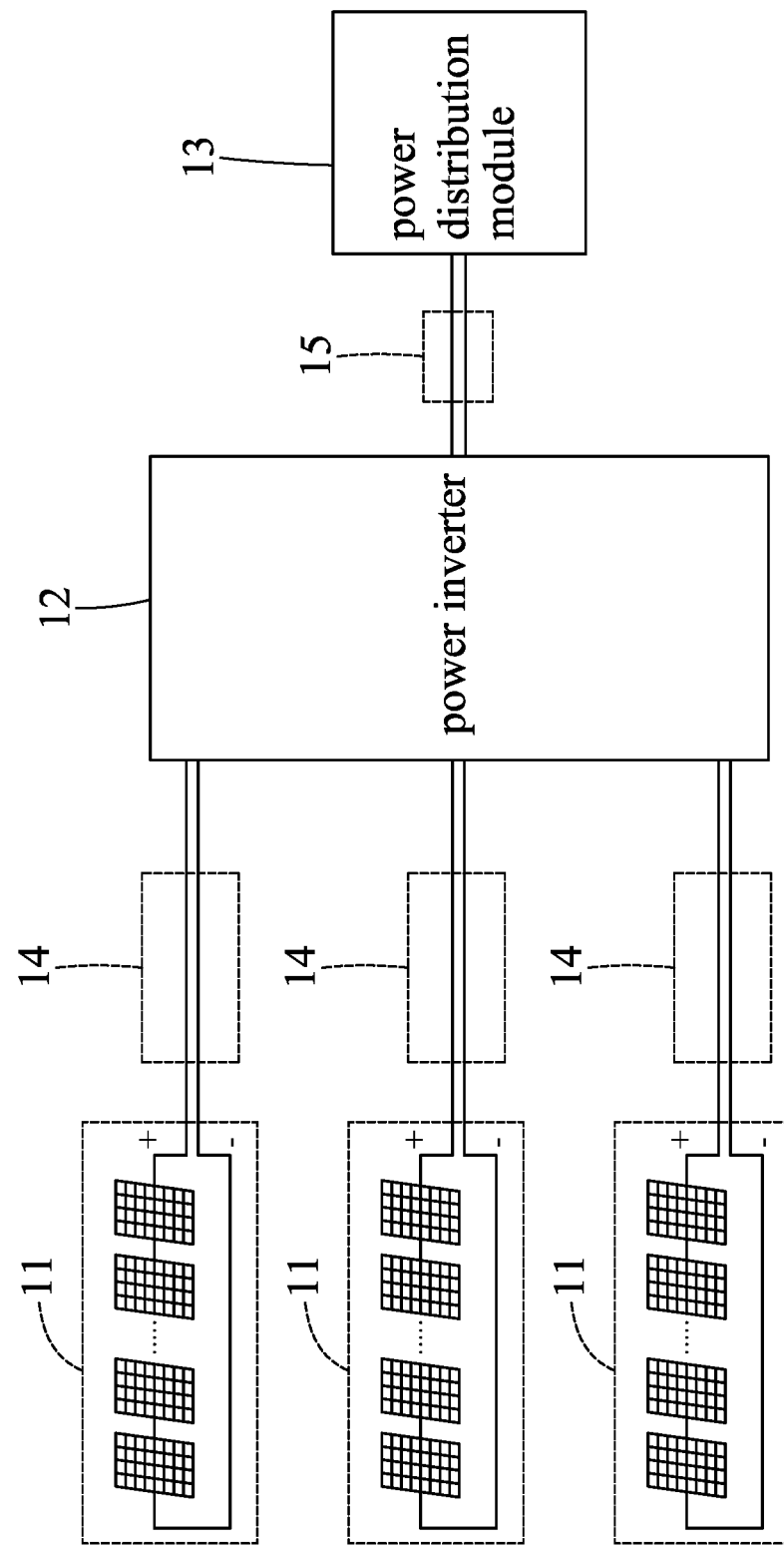
FIG. 1 illustrates a conventional solar power grid.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the terms "connected to", "electrically connected to" may refer to a physical connection between two or more electronic devices or components via an electrical conductive material (which may be referred to as a direct electrical connection), via other electronic devices or components (which may be referred to as an indirect electrical connection) or wireless communications between two or more electronic devices or components using a wireless communication technique, such as a short-range wireless communication module supporting a short-range wireless communication network using a wireless technology of Bluetooth® and/or Wi-Fi, etc., and a mobile communication module supporting telecommunication using Long-Term Evolution (LTE), a long range (LoRa) communication, the third generation (3G), fourth generation (4G), and/or fifth generation (5G) of wireless mobile telecommunications technology, fifth and/or the like.

Figure 2:
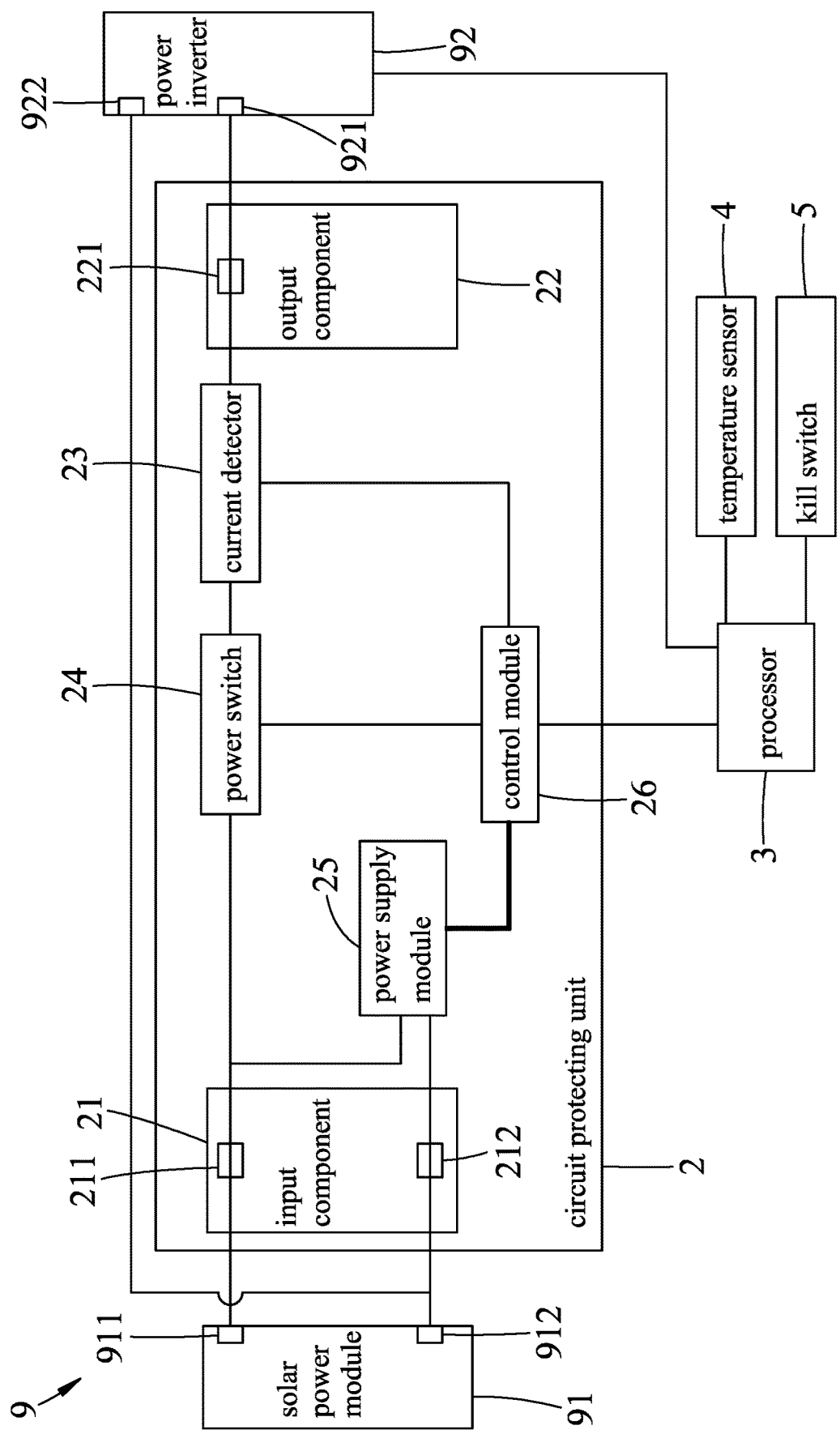
FIG. 2 is a block diagram illustrating an abnormality detecting system for a solar power grid according to one embodiment of the disclosure.

FIG. 2 is a block diagram illustrating an abnormality detecting system used for a solar power grid 9 according to one embodiment of the disclosure.

In this embodiment, the solar power grid 9 includes a solar power module 91 and a power inverter 92. The solar power module 91 includes one or more solar panels (not shown) that convert sunlight into electricity, and a first output node 911 and a second output node 912 that cooperatively output the electricity in the form of a direct current (DC) signal (referred to "solar power signal" hereinafter). Specifically, the first output node 911 outputs a first unipolar signal, the second output node 912 outputs a second unipolar signal, and the first unipolar signal and the second unipolar signal form the solar power signal together. The power inverter 92 is electrically connected to the solar power module 91 to receive the solar power signal therefrom, and is configured to convert the solar power signal into a converted power signal in the form of an alternating current (AC) signal and to output the converted power signal to, for example, a power distribution module (not shown) of the solar power grid 9. In this embodiment, the power inverter 92 includes a first receiving node 921, and a second receiving node 922 that is electrically connected to the second output node 912 to receive the second unipolar signal.

In this embodiment, the power inverter 92 may be embodied using a photovoltaic (PV) inverter, and includes a maximum power point tracking (MPPT) module (not depicted in the drawings) that is capable of configuring the power inverter 92 to maximize power extraction from the solar power module 91 (i.e., to obtain the greatest power possible). It is noted that the operations for the MPPT module are readily known in the pertinent art, and details thereof are omitted herein for the sake of brevity. It is noted that in different embodiments, additional MPPT modules may be installed on the power inverter 92.

Additionally, the power inverter 92 is configured to measure a number of parameters associated with the solar power module 91. For example, the power inverter 92 may be configured to measure, via the MPPT module, an AC value of the converted power signal, a DC voltage value of the solar power signal received by the MPPT module, an input impedance seen from the power inverter 92, etc. It is noted that the input impedance in this embodiment may be measured by the power inverter 92 first measuring a first insulation resistance between the first receiving node 921 and ground, and a second insulation resistance between the second receiving node 922 and ground, and by the power inverter 92 then calculating an equivalent impedance from the first insulation resistance and the second insulation resistance to serve as the input impedance.

In this embodiment, the parameters measured by the power inverter 92 (e.g., the AC value, the DC voltage, etc.) may be transmitted to an external component for further analysis, and the power inverter 92 is configured to determine whether the input impedance is lower than a predetermined impedance. When it is determined by the power inverter 92 that the input impedance is lower than the predetermined impedance, the power inverter 92 is configured to proceed to generate an error signal. It should be noted that the AC value of the converted power signal is a magnitude of the current of the converted power signal, and the DC voltage value of the solar power signal is a magnitude of the voltage of the solar power signal.

The abnormality detecting system includes a circuit protecting unit 2, a processor 3, a temperature sensor 4, and a manual kill switch 5.

The circuit protecting unit 2 is electrically connected between the solar power module 91 and the power inverter 92, and is connected to the processor 3.

The processor 3 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc. In this embodiment, the processor 3 is embodied using a microprocessor that includes a communication module (e.g., a wireless communication module, a wired network module, etc.) to receive and transmit signals.

The temperature sensor 4 is electrically connected to the processor 3, and may be embodied using a digital temperature sensor that includes a communication module (e.g., a wireless communication module, a wired network module, etc.). The temperature sensor 4 may be configured to periodically generate a reading of ambient temperature, and to transmit the reading of the ambient temperature to the processor 3 using the communication module. In different embodiments, a plurality of temperature sensors 4 may be employed and disposed at various parts of the solar power grid 9 (e.g., beside the solar power module 91 and the power inverter 92) and/or the circuit protecting unit 2.

The circuit protecting unit 2 includes an input component 21, an output component 22, a current detector 23, a power switch 24, a power supply module 25 and a control module 26.

The input component 21 includes a first port 211 and a second port 212 that are electrically connected to the first output node 911 and the second output node 912, respectively. In this configuration, the input component 21 is configured to receive the solar power signal from the solar power module 91 through the first and second ports 211, 212. Specifically, the first and second ports 211, 212 receive the first and second unipolar signals from the first and second output nodes 911, 912, respectively.

The output component 22 is electrically connected between the power switch 24 and the power inverter 92. Specifically, the output component 22 includes an output port 221 that is connected to the first receiving node 921 of the power inverter 92. In this configuration, both the first receiving node 921 and the second receiving node 922 of the power inverter 92 are connected to the solar power module 91 so as to receive the solar power signal therefrom. Specifically, the first receiving node 921 receives the first unipolar signal from the output port 221 of the output component 22, and the second receiving node 922 receives the second unipolar signal from the second output node 912 of the solar power module 91. It is noted that the circuit protecting unit 2 may be configured that characteristics of the solar power signal (e.g., an amount of electrical current, a voltage, etc.) are not changed in essence when the solar power signal passes through the circuit protecting unit 2.

The current detector 23 is electrically connected between the input component 21 and the output component 22, and is configured to measure an amount of electrical current (i.e., the first unipolar signal) flowing therethrough. For example, the current detector 23 may be embodied using an integrated circuit.

The power switch 24 is electrically connected to the first port 211 of the input module 21. Specifically, the current detector 23 and the power switch 24 are electrically connected in series between the first port 211 and the output component 22. In some embodiments, the power switch 24 may be embodied using one of a silicon controlled rectifier (SCR), an insulated gate bipolar transistor (IGBT), and a metal-oxide-semiconductor field-effect transistor (MOSFET). In other embodiments, other electrical switch components may be employed.

The power supply module 25 is electrically connected between the input component 21 and the control module 26, and is configured to provide power supply to the control module 26. Specifically, the power supply module 25 is electrically connected to the first port 211 and the second port 212 of the input component 21 to receive the solar power signal, and to generate the power supply for the control module 26 based on the solar power signal.

The control module 26 is electrically connected to the current detector 23, the power switch 24, the power supply module 25 and the processor 3. The control module 26 is capable of controlling the power switch 24 to switch between an open circuit state, in which the power switch 24 disallows electrical current to flow therethrough, and a closed circuit state, in which the power switch 24 allows electrical current to flow therethrough. Specifically, in the open circuit state, the first port 211 and the output port 221 become disconnected, and therefore the first unipolar signal cannot travel to the power inverter 92.

The processor 3 is connected to the control module 26 so as to receive a number of parameters (e.g., the amount of electrical current flowing through the current detector 23) therefrom, and to control the operation thereof (essentially, to control the state of the power switch 24). Additionally, the processor 3 is connected to the power inverter 92 to obtain a number of parameters (e.g., an amount of electrical current of the converted power signal outputted by the power inverter 92) therefrom.

In this embodiment, the processor 3 may control the control module 26 to change the state of the power switch 24 based on the parameters received from the control module 26 and the power inverter 92.

In use, when the solar power grid 9 is operational (i.e., operating normally), the power switch 24 is in the closed circuit state, and the solar power signal travels from the solar power module 91 through the circuit protecting unit 2 to the power inverter 92. In this case, the amount of electrical current flowing through the current detector 23 and the amount of electrical current of the converted power signal outputted by the power inverter 92 are transmitted to the processor 3.

When it is determined that the amount of the converted power signal is zero and the amount of the electrical current flowing through the current detector 23 is non-zero, the processor 3 may determine that the solar power module 91 is functional and the power inverter 92 is not functional. In this case, if the solar power signal is continuously transmitted to the non-functional power inverter 92, adverse effects such as short-circuiting, sparks or fire may occur. As such, the processor 3 may transmit a control signal to the control module 26, which, in response to receipt of the control signal, would switch the power switch 24 to the open circuit state. When the power switch 24 is in the open circuit state, the solar power signal cannot go through the circuit protecting unit 2, and therefore cannot reach the non-functional power inverter 92, thereby preventing possible hazards.

In some embodiments, the processor 3 is further programmed to control the operations of the control module 26 based on the reading of the ambient temperature received from the temperature sensor 4. Specifically, the processor 3 is configured to periodically obtain one reading of the ambient temperature from the temperature sensor 4 (e.g., every 20 seconds), and when it is determined that each of a number of successive readings (e.g., three) of the temperature sensor 4 is higher than a predetermined threshold (e.g., 80 degrees Celsius), the processor 3 determines that a hazardous situation such as fire has occurred, and transmits the control signal to the control module 26 for the control module 26 to switch the power switch 24 to the open circuit state. In this configuration, the processor 3 may prevent the power inverter 92 from receiving the solar power signal in the hazardous situation, thereby preventing additional accidents, such as a closed and running circuit catching fire, or personnel who is handling the hazardous situation (e.g., a firefighter) getting an electric shock.

In some embodiments, the processor 3 is further programmed to control the operations of the control module 26 based on manual operations of the manual kill switch 5. In use, when a user notices any situation that would require the solar power grid 9 to stop operating, he/she may manually operate the manual kill switch 5, such that the manual kill switch 5 generates a shutdown signal and transmits the shutdown signal to the processor 3 upon the manual operation. In response to receipt of the shutdown signal from the manual kill switch 5, the processor 3 controls the control module 26 to switch the power switch 24 to the open circuit state. In this embodiment, the manual kill switch 5 is an external switch used to shut off the circuit protecting unit 2 in an emergency.

In some embodiments, the processor 3 is further programmed to control the operations of the control module 26 based on some parameters received from the power inverter 92. For example, the processor 3 may receive a voltage value of the solar power signal (i.e., the DC voltage value) from the power inverter 92. Then, the processor 3 is configured to compare the voltage value of the solar power signal with a predetermined voltage value, and generate an alert when the voltage value of the solar power signal is lower than the predetermined voltage value. The alert may be a message that can be displayed using a display screen (not shown) connected to the processor 3.

In a case that the solar power module 91 includes a plurality of solar panels connected in series, the processor 3 may be configured to further determine a quantity of the solar panel (s) of the solar power module 91 that is(are) non-functional based on a difference between the voltage value of the solar power signal and the predetermined voltage value. In one example, the solar power module 91 includes twenty-two solar panels connected in series, and each of the solar panels is configured to generate a partial solar power signal with 30 volts, and a resulting voltage value of the solar power signal is a summation of voltage values respectively of the partial solar power signals generated by the solar panels, which is 660 volts.

In this case, it is expected that the voltage value of the solar power signal received by the power inverter 92 is also 660 volts (i.e., the predetermined voltage value). When it is determined that the voltage value of the solar power signal is lower than 660 volts, it may be deduced that one or more of the twenty-two solar panels may be non-functional. For example, when the voltage value of the solar power signal is 600 volts, it may be deduced that two of the solar panels are non-functional, and an alert with relevant information is generated. This may be convenient for repair personnel to perform repair task on the solar power module 91.

Figure 3:
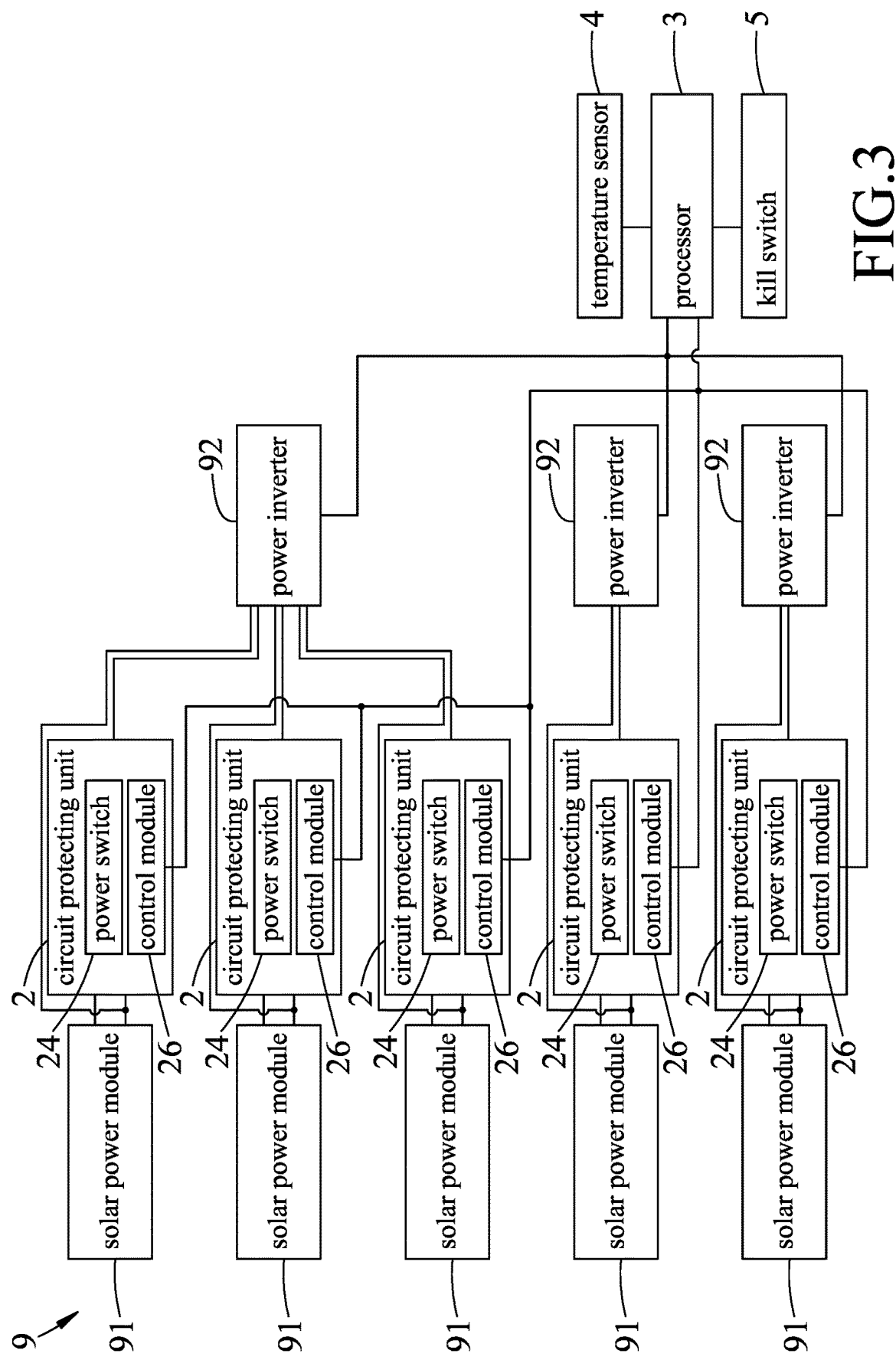
FIG. 3 is a block diagram illustrating an abnormality detecting system for a solar power grid according to one embodiment of the disclosure.

FIG. 3 is a block diagram illustrating an abnormality detecting system to be used for a solar power grid 9 according to one embodiment of the disclosure. In this embodiment, the solar power grid includes five solar power modules 91 that respectively output five solar power signals, and three power inverters 92. Each of the solar power modules 91 may be embodied using the solar power module 91 described in the embodiment of FIG. 2.

In use, each of the power inverters 92 may be connected to one or more solar power modules 91 to receive the solar power signal(s) therefrom. In the embodiment of FIG. 3, one of the power inverters 92 (e.g., the top one in FIG. 3) is connected to three solar power modules 91. Accordingly, said one of the power inverters 92 may be equipped with three MPPT modules for configuring said one of the power inverters to maximize power extraction from the three connected solar power modules 91, respectively. It is noted that the operations of the MPPT modules are readily known in the related art, and details thereof are omitted herein for the sake of brevity.

Additionally, the top one of the power inverters 92 may be configured to measure a number of parameters associated with each of the solar power modules 91 connected thereto based on the operations of the associated MPPT modules. For example, for each of the solar power modules 91 connected to the top one of the power inverters 92, the top one of the power inverters 92 may be configured to measure, via the MPPT module corresponding to the solar power module 91, a DC voltage value of the solar power signal received by the MPPT module, an input impedance seen from the power inverter 92, etc. It is noted that the input impedance in this embodiment may be measured by the power inverter 92 first measuring a first insulation resistance between the first receiving node 921 and ground, and a second insulation resistance between the second receiving node 922 and ground, and by the power inverter 92 then calculating an equivalent impedance from the first insulation resistance and the second insulation resistance to serve as the input impedance.

In this embodiment, the parameters measured by the power inverter 92 (e.g., the AC value, the DC voltage value, etc.) may be transmitted to an external component for further analysis, and the power inverter is configured to determine whether the input impedance is lower than a predetermined impedance. When it is determined that the input impedance is lower than the predetermined impedance, the power inverter 92 is configured to proceed to generate the error signal.

In this embodiment, the abnormality detecting system includes five circuit protecting units 2, a processor 3, a temperature sensor 4, and a manual kill switch 5. Each of the components in this embodiment may be embodied using a corresponding component described in the embodiment of FIG. 2, and some of the components of the circuit protecting units 2 are omitted in FIG. 3 for the sake of simplicity.

Each of the circuit protecting units 2 is disposed between a respective one of the solar power modules 91 and one of the power inverters 92, and is connected to the processor 3. In this embodiment, top three of the circuit protecting units 2 in FIG. 3 are connected to the top one of the power inverters 92. It is noted that in other embodiments, other connection relations among the solar power modules 91, the circuit protecting units 2 and the power inverters 92 may be employed.

In this embodiment, the processor 3 may be programmed to enter a reset mode periodically (e.g., once a day) to perform a reset operation for the abnormality detecting system. For example, the processor 3 may be programmed to, at a certain time of each day, control the control modules 26 respectively of the circuit protecting units 2 to control the power switches 24 respectively of the circuit protecting units 2 to switch to the open circuit state. This may be done by a personnel may manually operate the abnormality detecting system so as to perform a setup operation, so as to set the certain time of each day, or other occasions, for the processor 3 to enter the reset mode.

After a predetermined time period (e.g., one minute), the processor 3 may be programmed to control each of the control modules 26 to control the corresponding power switch 24 to switch to the closed circuit state, thereby resuming operation of the abnormality detecting system. In some embodiments, a personnel may manually operate the abnormality detecting system such the processor 3 is set to perform the reset operation sequentially on the circuit protecting units 2. That is, after the power switches 24 are all in the open circuit state, the processor 3 may control the control modules 26 of the circuit protecting units 2 to control the corresponding power switches 24 to switch to the closed circuit state one by one.

It has been established that in this embodiment, each of the power inverters 92 is configured to measure the DC voltage value of the solar power signal outputted by each solar power module 91 that is electrically connected thereto and to measure the input impedance seen from the power inverter 92. Accordingly, for any one of the plurality of power inverters 92, when it is determined that an input impedance that is different from an associated normal value is detected by the power inverter 92, which means that at least one of the solar power module(s) 91 electrically connected to the power inverter 92 is non-functional, the power inverter 92 proceeds to transmit the error signal to the processor 3 and then shuts down for a predetermined time period before restarting. In response to receipt of the error signal from the power inverter 92, the processor 3 is configured to operate in a troubleshooting mode.

Specifically, in the troubleshooting mode, for each of the circuit protecting units 2 connected to the power inverter 92, the processor 3 first controls the control module 26 to switch the power switch 24 to the open circuit state. For example, in the embodiment of FIG. 3, when the error signal is received from the top one of the power inverters 92, the processor 3 controls the control modules 26 of the top three of the circuit protecting units 2 to switch the power switches 24 to the open circuit state.

Afterward, when it is determined that the power inverter 92 has become operational (i.e., has restarted), the processor 3 conducts a test procedure in which the processor 3 controls the control modules 26 of the circuit protecting units 2 that are connected to the power inverter 92, one by one, to switch the corresponding power switches 24 to the closed circuit state for a predetermined time period (e.g., one minute) before switching the corresponding power switches 24 back to the open circuit state. Regarding each of the power switches 24, the processor 3 then determines whether the error signal is received from an associated power inverter 92.

Taking the top one of the power inverters 92 in FIG. 3 as an example, in the test procedure, the three power switches 24 will be switched to the closed circuit state for the predetermined time period one by one. During each predetermined time period, the processor 3 is configured to determine whether the error signal is still received from the top one of the power inverters (that is, whether each of the power inverter 92 observes an input impedance that is equal to the normal value when the connected solar power module (s) 91 is connected), so as to determine which one (s) of the corresponding solar power modules 91 is non-functional.

Afterward, the processor 3 is configured to determine whether a component of the solar power grid 9 (e.g., a corresponding solar power module 91, or other connected components or wires) connected to each of the power switches 24 is functional based on whether an error signal is received from the power inverter 92, and to generate a message indicating the result of the determination. Specifically, when an error signal is received when a specific power switch 24 is in the closed circuit state, the processor 3 may deduce that one or more components among the associated solar power module 91, the associated circuit protecting unit 2 and the associated power inverter 92 may be damaged. Otherwise, when no error signal is received, the processor 3 may deduce that the associated components are functional.

In some cases, the processor 3 is further configured to control the control module 26 of each of the circuit protecting units 2 that is connected to the power inverter 92 determined to be functional (i.e., no error signal is received) to switch the corresponding power switch 24 to the closed circuit state after the implementation of the troubleshooting mode, allowing a component of the solar power grid 9 that is determined to be functional to resume operation while enabling relevant personnel to proceed to repair a component of the solar power grid 9 that is determined to be non-functional.

It is noted that in this embodiment, operations of the processor 3 related to the temperature sensor 4, the manual kill switch 5, and the voltage value of the solar power signal from each of the power inverters 92 may be implemented in a manner similar to those described in the embodiment of FIG. 2, and details thereof are omitted herein for the sake of brevity.

Figure 4:
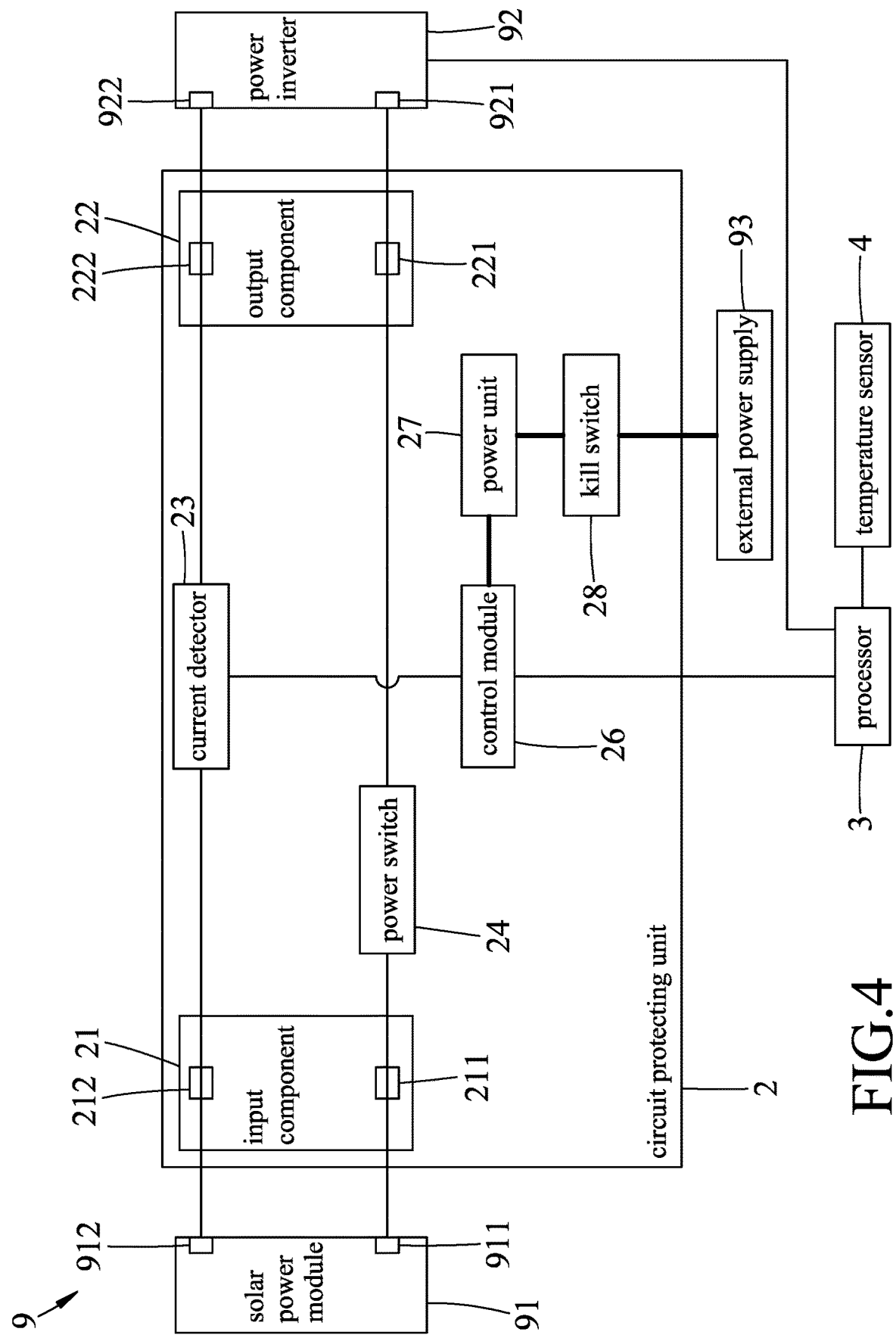
FIG. 4 is a block diagram illustrating an abnormality detecting system for a solar power grid according to one embodiment of the disclosure.

FIG. 4 is a block diagram illustrating an abnormality detecting system to be used for a solar power grid 9 according to one embodiment of the disclosure. In this embodiment, the solar power grid 9 includes a solar power module 91, a power inverter 92 and an external power supply 93. The solar power module 91 and the power inverter 92 may be embodied using the corresponding components described in the embodiments of FIGS. 2 and 3.

In this embodiment, the abnormality detecting system includes a circuit protecting unit 2, a processor 3 and a temperature sensor 4. The processor 3 and the temperature sensor 4 may be embodied using the corresponding components described in the embodiments of FIGS. 2 and 3.

The circuit protecting unit 2 includes an input component 21, an output component 22, a current detector 23, a power switch 24, a control module 26, a power unit 27 and a kill switch 28. It is noted that the power unit 27 is a transformer configured to receive power from the external power supply 93, and to supply electricity to the processor 26.

The input component 21 may be embodied using one that is described in the embodiment of FIG. 2. The output component 22 includes a first output port 221 and a second output port 222. The current detector 23 is connected between the second port 212 of the input component 21 and the second output port 222 of the output component 22. The power switch 24 is connected between the first port 211 of the input component 21 and the first output port 221 of the output component 22. The first output port 221 is also connected to the first receiving node 921 of the power inverter 92, and the second output port 222 is also connected to the second receiving node 922 of the power inverter 92. In this configuration, the first and second ports 211, 212 of the input component 21 receive the solar power signal from the solar power module 91 together, and the first and second output ports 221, 222 of the output component 22 output the solar power signal to the power inverter 92 together. It is noted that the operations of the current detector 23 and the power switch 24 may be similar to those described in the embodiment of FIG. 2, and details thereof are omitted herein for the sake of brevity.

The control module 26 is connected to the current detector 23, the power switch 24, the power unit 27 and the processor 3. The power unit 27 is connected to the kill switch 28, which is connected to the external power supply 93. That is to say, the circuit protecting unit 2 in this embodiment is powered by the external power supply 93.

In this embodiment, when the control module 26 controls the power switch 24 to switch to the closed circuit state, the electrical connection between the first output port 221 and the first port 211 is established. When the control module 26 controls the power switch 24 to switch to the open circuit state, the electrical connection between the first output port 221 and the first port 211 becomes disconnected.

In use, when the solar power grid 9 is operational, the power switch 24 is in the closed circuit state, and the solar power signal travels from the solar power module 91 through the circuit protecting unit 2 to the power inverter 92. In this case, the amount of electrical current flowing through the current detector 23 and the amount of electrical current of the converted power signal outputted by the power inverter 92 are transmitted to the processor 3.

When it is determined that the amount of electrical current of the converted power signal is zero and the amount of the electrical current flowing through the current detector 23 is non-zero, the processor 3 may determine that the solar power module 91 is functional and the power inverter 92 is not functional. In this case, if the solar power signal is continuously transmitted to the non-functional power inverter 92, adverse effects such as short-circuiting, sparks or fire may occur. As such, the processor 3 may be programmed to control the control module 26 to control the power switch 24 to switch to the open circuit state. In the open circuit state, the solar power signal cannot go through the circuit protecting unit 2, and therefore cannot reach the non-functional power inverter 92, thereby preventing potential accidents.

The kill switch 28 is normally in a conductive state, in which electrical current can flow from the external power supply 93 to the power unit 27 through the kill switch 28 (such that the control module 26 is powered by the external power supply 93). The kill switch 28 may include a manual interface that enables manual operation (e.g., a button, a lever, etc.) and/or a remote interface that enables remote operation (e.g., a wireless communication chip that can receive a wireless signal) to switch to a non-conductive state, in which electrical current cannot flow through the kill switch 28. When the kill switch 28 is in the non-conductive state, the control module 26 of the circuit protecting unit 2 becomes unpowered, and therefore the solar power signal cannot go through the circuit protecting unit 2 since the power switch 24 would switch to a cutoff mode because of the lack of power. In this configuration, when an emergency situation occurs and the solar power grid 9 needs to be immediately powered down, relevant personnel may operate the kill switch 28 to switch to the non-conductive state.

It is noted that in this embodiment, operations of the processor 3 related to the temperature sensor 4 and the voltage value of the solar power signal from the power inverter 92 may be implemented in a manner similar to those described in the embodiment of FIG. 2, and details thereof are omitted herein for the sake of brevity.

Figure 5:
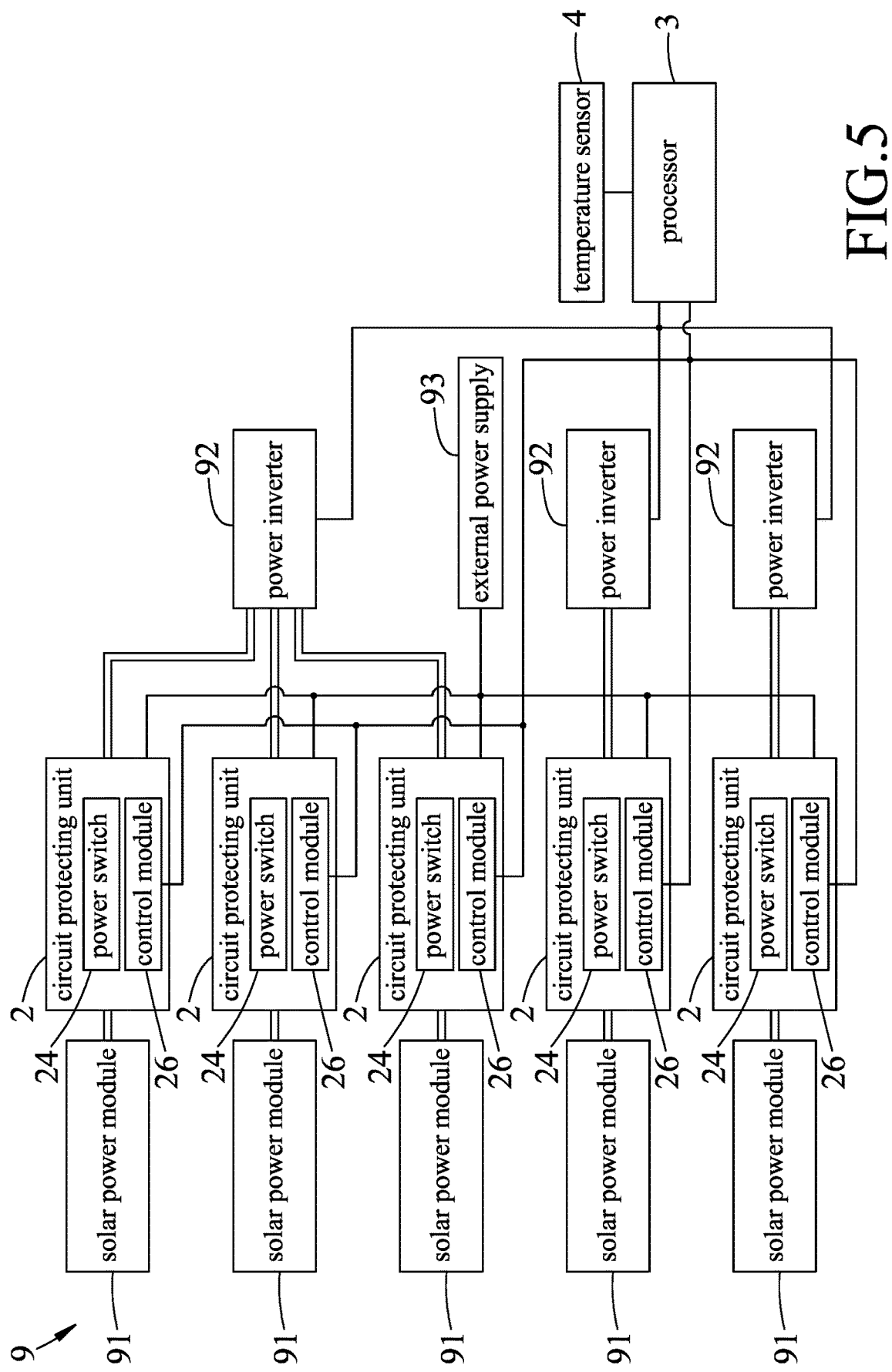
FIG. 5 is a block diagram illustrating an abnormality detecting system for a solar power grid according to one embodiment of the disclosure.

FIG. 5 is a block diagram illustrating an abnormality detecting system to be used for a solar power grid 9 according to one embodiment of the disclosure. In this embodiment, the solar power grid 9 includes five solar power modules 91 and three power inverters 92. Each of the solar power modules 91 may be embodied using the one described in the embodiment of FIG. 4.

In use, each of the power inverters 92 may be connected to one or more solar power modules 91 to receive the solar power signal(s) therefrom. In the embodiment of FIG. 5, a top one of the power inverters is connected to three solar power modules 91. Accordingly, the top one of the power inverters 92 may be equipped with three MPPT modules for configuring the power inverter 92 to maximize power extraction from the three connected solar power modules 91, respectively. It is noted that operations of the MPPT modules are readily known in the related art, and details thereof are omitted herein for the sake of brevity.

Additionally, the top one of the power inverters 92 may be configured to measure a number of parameters associated with each of the connected solar power modules 91 via the MPPT module corresponding to the solar power module 91. When it is determined that the input impedance seen from the power inverter 92 is lower than the predetermined impedance, the power inverter is configured to proceed to generate the error signal.

In this embodiment, the solar power grid 9 includes an external power supply 93. The abnormality detecting system includes five circuit protecting units 2, a processor 3 and a temperature sensor 4. Each of these components in this embodiment may be embodied using a corresponding component described in the embodiment of FIG. 4, and some of the components of the circuit protecting units 2 are omitted in FIG. 5 for the sake of simplicity.

Each of the circuit protecting units 2 is disposed between a respective one of the solar power modules 91 and one of the power inverters 92, is powered by the external power supply 93 via the kill switch 28, and is connected to the processor 3. In this embodiment, the top three circuit protecting units 2 are connected to the top one of the power inverters 92. It is noted that in other embodiments, other connection relations among the solar power modules 91, the circuit protecting units 2 and the power inverters 92 may be employed.

In the case that any one of the circuit protecting units 2 needs to be urgently unpowered, a corresponding kill switch 28 may be operated to switch to the non-conductive state, as described in the embodiment of FIG. 4. As such, the solar power signal cannot go through the circuit protecting unit 2.

In this embodiment, the processor 3 may be also programmed to periodically (e.g., once a day) perform the reset operation on the abnormality detecting system. For example, the processor 3 may be programmed to, at a certain time of each day, control the control modules 26 respectively of the circuit protecting units 2 to control the corresponding power switches 24 to switch to the open circuit state.

After a predetermined time period (e.g., one minute), the processor 3 may be programmed to control the control modules 26 of the circuit protecting units 2 to control the corresponding power switches 24 to switch to the closed circuit state, so as to therefore resume operation. In some embodiments, the reset operation may be done sequentially with respect to the circuit protecting units 2. That is, the processor 3 may control the control modules 26 of the circuit protecting units 2 to control the corresponding power switches 24 to switch to the closed circuit state one by one.

It has been established that in this embodiment, each of the power inverters 92 is configured to measure the DC voltage value of the solar power signal outputted by each solar power module 91 that is electrically connected thereto, and to measure the input impedance seen from the power inverter 92. Accordingly, for any one of the power inverters 92, when it is determined that an input impedance detected by the power inverter 92 is different from an associated normal value, the power inverter 92 proceeds to transmit the error signal to the processor 3 and then shuts down. In response to receipt of the error signal from the power inverter 92, the processor 3 is configured to operate in a troubleshooting mode.

Specifically, in the troubleshooting mode, for each of the circuit protecting units 2 connected to the power inverter 92, the processor 3 first controls the control module 26 of the circuit protecting unit 2 to switch the corresponding power switch 24 to the open circuit state. For example, in the embodiment of FIG. 5, when the error signal is received from the top one of the power inverters 92, the processor 3 controls the control modules 26 of the top three of the circuit protecting units 2 to switch the power switches 24 to the open circuit state.

Afterward, when it is determined that the power inverter 92 has become operational, the processor 3 conducts a test procedure in which the processor 3 controls the control modules 26 of the circuit protecting units 2 that are connected to the power inverter 92, one by one, to switch the corresponding power switches 24 to the closed circuit state for a predetermined time period (e.g., one minute) before switching the corresponding power switch 24 back to the open circuit state.

Taking the top one of the power inverters 92 in FIG. 5 as an example, after the top one of the power inverters 92 transmits the error signal, in the test procedure, the three power switches 24 respectively of the top three circuit protecting units 2 will be switched to the closed circuit state for the predetermined time period one by one. During each predetermined time period, the processor 3 is configured to determine whether the error signal is still received from the top one of the power inverters 92, so as to determine which one (s) of the corresponding solar power modules 91 is non-functional. Afterward, for each of the power switches 24, the processor 3 is configured to determine whether a component of the solar power grid 9 connected to the power switch 24 is functional based on whether an error signal is received from the one of the power inverters 92, and to generate a message that indicates the result of the determination and that can be used for further analysis. In some cases, the processor 3 is further configured to control the control module 26 of each of the circuit protecting units 2 that is connected to the one of the power inverters 92 determined to be functional to switch the corresponding power switch 24 to the closed circuit state, thereby allowing relevant personnel to proceed to repair the part(s) of the solar power grid 9 that is determined to be non-functional.

It is noted that in this embodiment, operations of the processor 3 related to the temperature sensor 4 and the voltage value of the solar power signal from each of the power inverters 92 may be implemented in a manner similar to those described in the embodiment of FIG. 2, and details thereof are omitted herein for the sake of brevity.

To sum up, the embodiments of the disclosure provide an abnormality detecting system that can be installed in a front end of a solar power grid. Specifically, the abnormality detecting system may be disposed between at least one solar power module and at least one power inverter. Using the configurations of the abnormality detecting system, when a part of the solar power module (e.g., one or more of the solar panels) or a part of the power inverter becomes non-functional, or when an adverse situation (e.g., a fire) has occurred, the abnormality detecting system may be controlled to or may automatically prevent the solar power signal from being transmitted to the power inverter, so as to prevent additional damages to the solar power grid. Additionally, during operation, the abnormality detecting system may be controlled to perform the reset operation, and in the case an error signal is generated, perform the troubleshooting operation so as to determine which parts of the solar power grid needs repair. In some embodiments, the abnormality detecting system includes a kill switch to enable relevant personnel to immediately un-power the circuit protecting unit in emergency situations.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An abnormality detecting system for a solar power grid, the solar power grid including at least one power inverter and at least one solar power module, each of the at least one power inverter having a first receiving node and a second receiving node, the abnormality detecting system being disposed between the at least one solar power module and the at least one power inverter, each of the at least one solar power module including at least one solar panel, and both a first output node and a second output node cooperatively outputting a solar power signal formed as a direct current signal, the second receiving node of the at least one power inverter being electrically connected to the second output node of a corresponding one of the at least one solar power module, the at least one power inverter being electrically connected to the at least one solar power module to receive the solar power signal therefrom and being configured to convert the solar power signal into a converted power signal formed as an alternating current (AC) signal and output the converted power signal, and the abnormality detecting system, comprising:

at least one circuit protecting unit, each circuit protecting unit including:

an input component including a first port and a second port, the first and second ports being electrically connected, respectively, to the first output node and the second output node of the corresponding one of the at least one solar power module, and thereby the input component receiving the solar power signal through said first and second ports;

a power switch electrically connected to said first port of said input component;

an output component electrically connected between said power switch and the power inverter, wherein said output component is electrically connected to the first receiving node of a corresponding one of the at least one power inverter;

a current detector electrically connected between said input component and said output component, wherein said current detector and said power switch are electrically connected in series to be together positioned between said first port of said input component and said output component, and the current detector being configured to measure electrical current flowing therethrough; and a control module electrically connected to said current detector and said power switch, said control module controlling said power switch to switch between an open circuit state and a closed circuit state, wherein in the open circuit state, electrical current is not flowable through said power switch, and wherein in the closed circuit state, electrical current is flowable through said power switch;

a power supply module electrically connected between said input component and said control module, said power supply module supplying power to said control module according to the solar power signal; and a processor electrically connected to said control module and the at least one power inverter, and the processor being configured to acquire a magnitude of electrical current of the converted power signal output by the at least one power inverter;

wherein when said power switch is in the closed circuit state, the processor is configured to actuate the control module to obtain a magnitude of electrical current flowing through said current detector; and wherein when it is determined that the magnitude of electrical current of the converted power signal is zero and the magnitude of the electrical current flowing through said current detector is non-zero, the processor is configured to, responsively, actuate said control module to switch said power switch to the open circuit state; and wherein when the abnormality detecting system is disposed between a plurality of solar power modules and a plurality of power inverters, each of a plurality of said circuit protecting units is electrically connected to a respective one of the solar power modules, to a respective one of the power inverters, and to said processor, each of the plurality of power inverters measures an input impedance with respect to that particular power inverter, and responsive to the at least one power inverter determining that the input impedance of that particular power inverter is different from an associated normal value, the particular power inverter transmits an error signal to said processor and shuts down, and said processor is configured to operate in a troubleshooting mode responsive to receiving the error signal from the particular power inverter, wherein, in the troubleshooting mode, said processor's operations include the following:
actuate said control module to switch said power switch to the open circuit state for each of said circuit protecting units connected to a corresponding one of the power inverters;
conduct a test procedure upon a determination being made with respect to the particular power inverter that the input impedance thereof is no longer different from the associated normal value, the test procedure includes said processor controlling, one by one, said control module(s), respectively, of said circuit protecting unit(s), connected to a corresponding one of the power inverters, to switch said corresponding power switch thereof to the closed circuit state for a predetermined time period; and
determine, for each of said circuit protecting units connected to one of the power inverters, in turn, whether a component of the solar power grid connected to said power switch is functional based on whether the error signal is received from one of the at least one power inverter.

2. The abnormality detecting system of claim 1, wherein said processor is further configured to:
receive a voltage value of the solar power signal from the at least one power inverter;
compare the voltage value of the solar power signal with a predetermined voltage value; and
generate an alert when the voltage value of the solar power signal is lower than the predetermined voltage value.

3. The abnormality detecting system of claim 1, further comprising a manual kill switch that is electrically connected to said processor and that generates a shutdown signal and transmits the shutdown signal to said processor upon manual operation,
wherein in response to receipt of the shutdown signal from said manual kill switch, said processor controls said control module to control said power switch to switch to the open circuit state.

4. The abnormality detecting system of claim 1, further comprising a temperature sensor that is electrically connected to said processor and that is configured to periodically generate a reading of ambient temperature, wherein:
said processor is configured to periodically obtain one reading of the ambient temperature, and when it is determined that each of a number of successive readings of said temperature sensor is higher than a predetermined threshold, said processor controls said control module to control said power switch to switch to the open circuit state.

5. The abnormality detecting system of claim 1, wherein when the plurality of said circuit protecting units are each configured to be electrically connected to a respective one of the solar power modules, the at least one power inverter, and said processor, further comprising:
in response to a manual setup operation, said processor is configured to operate in a reset mode wherein said processor periodically controls said control modules respectively of said circuit protecting units to control said power switches, respectively, of said circuit protecting units to switch to the open circuit state for a predetermined time period.

6. The abnormality detecting system of claim 1, wherein during the troubleshooting mode, said processor is further configured to:
control, in response to a determination that no error signal is received when a corresponding one of said power switches is in the closed circuit state, a control module of another one of said circuit protection units to switch said power switch thereof to the closed circuit state, after implementation of the troubleshooting mode.

7. The abnormality detecting system of claim 1, wherein said power switch includes one of a silicon controlled rectifier (SCR), an insulated gate bipolar transistor (IGBT), or a metal-oxide-semiconductor field-effect transistor (MOSFET).

8. An abnormality detecting system for a solar power grid, the solar power grid including at least one power inverter and at least one solar power module, each of the at least one power inverter having a first receiving node and a second receiving node, the abnormality detecting system being disposed between the at least one solar power module and the at least one power inverter, each of the at least one solar power module including at least one solar panel, and both a first output node and a second output node cooperatively outputting a solar power signal formed as a direct current signal, the at least one power inverter being electrically connected to a corresponding one of the at least one solar power module to receive the solar power signal therefrom and being configured to convert the solar power signal to a converted power signal formed as an alternating current (AC) signal and output the converted power signal, and the abnormality detecting system, comprising:
an external power supply;
at least one circuit protecting unit, each circuit protecting unit including:
an input component including a first port and a second port, the first and second ports being electrically connected, respectively, to the first output node and the second output node of the corresponding one of the at least one solar power module, and thereby the input component receiving the solar power signal through said first and second ports;
a power switch electrically connected to said first port of said input component;
an output component electrically connected between said power switch and the at least one power inverter, said output component including a first output port and a second output port, respectively, electrically connected to the first receiving node and the second receiving node of a corresponding one of the at least one power inverter, wherein the first output port of said output component is also electrically connected to said power switch;
a current detector electrically connected between said input component and said output component, wherein the second output port of said output component is also electrically connected to said current detector, and the current detector being configured to measure electrical current flowing therethrough;
a control module electrically connected to said current detector and said power switch, said control module controlling said power switch to switch between an open circuit state and a closed circuit, wherein in the open circuit state, electrical current is not flowable through said power switch, and wherein in the closed circuit state, electrical current is flowable through said power switch;

a power unit electrically connected to said control module, and a kill switch electrically connected between said power unit and said external power supply, and said kill switch being configured to switch between a conductive state and a non-conductive state, wherein in the conductive state, said control module is powered by the external power supply, and wherein in the non-conductive state, said control module does not receive power from the external power supply; and a processor electrically connected to said control module and the at least one power inverter, and the processor being configured to obtain a magnitude of electrical current of the converted power signal output by the at least one power inverter;

wherein when said power switch is in the closed circuit state, the processor is configured to actuate the control module to obtain a magnitude of electrical current flowing through said current detector;

wherein when it is determined that the magnitude of electrical current of the converted power signal is zero and the magnitude of the electrical current flowing through said current detector is non-zero, the processor is configured to responsively actuate said control module to switch said power switch to the open circuit state;

wherein when the abnormality detecting system is disposed between a plurality of solar power modules and a plurality of power inverters, each of a plurality of said circuit protecting units is electrically connected to a respective one of the solar power modules, a respective one of the power inverters, said processor, and said external power supply, wherein each of the plurality of power inverters measures an input impedance with respect to that particular power inverter, and responsive to the particular power inverter determining that the input impedance is different from an associated normal value, the power inverter transmits an error signal to said processor and shuts down, and wherein said processor operates in a troubleshooting mode responsive to receiving the error signal from at least one of the power inverters, wherein, in the troubleshooting mode, said processor's operations include the following:

actuate said control module to switch said power switch to the open circuit state for each of said circuit protecting units connected to a corresponding one of the power inverters;

conduct a test procedure upon a determination being made that one of the power inverters has become operational, the test procedure includes said processor controlling, one by one, said control module(s), respectively, of said circuit protecting unit(s) connected to a corresponding one of the power inverters to switch said corresponding power switch thereof to the closed circuit state for a predetermined time period; and determine, for each of said circuit protecting units connected to a corresponding one of the power inverters, in turn, whether a component of the solar power grid connected to said power switch is functional based on whether the error signal is received from one of the at least one power inverter.

9. The abnormality detecting system of claim 8, wherein said processor is further configured to:

receive a voltage value of the solar power signal from the at least one power inverter;

compare the voltage value of the solar power signal with a predetermined voltage value; and generate an alert when the voltage value of the solar power signal is lower than the predetermined voltage value.

10. The abnormality detecting system of claim 8, further comprising a manual kill switch electrically connected between said power unit and said external power supply, and said kill switch being configured to operate in either one of a conductive state or in a non-conductive state responsive to manual operation thereof;

wherein in the conductive state of said manual kill switch, electrical current flows between said external power supply and said power unit to thereby power said control module, and wherein in the non-conductive state of said manual kill switch, electrical current does not flow through said power unit and thereby said control module is not powered.

11. The abnormality detecting system of claim 8, further comprising a temperature sensor that is electrically connected to said processor and that is configured to periodically generate a reading of ambient temperature, wherein:

said processor is configured to periodically obtain one reading of the ambient temperature, and when it is determined that each of a number of successive readings of said temperature sensor is higher than a predetermined threshold, said processor controls said control module to control said power switch to switch to the open circuit state.

12. The abnormality detecting system of claim 8, wherein when the plurality of said circuit protecting units are each configured to be electrically connected to a respective one of the solar power modules, the at least one power inverter, and said processor, further comprising:

said processor is configured to operate in a reset mode, wherein said processor periodically controls said control modules, respectively, of said circuit protecting units to control said power switches, respectively, of said circuit protecting units to switch to the open circuit state for a predetermined time period.

13. The abnormality detecting system of claim 8, wherein during the troubleshooting mode, said processor is further configured to:

control, in response to a determination that no error signal is received when a corresponding one of said power switches is in the closed circuit state, a control module of another one of said circuit protection units to switch said power switch thereof to the closed circuit state, after implementation of the troubleshooting mode.

14. The abnormality detecting system of claim 8, wherein said power switch includes one of a silicon controlled rectifier (SCR), an insulated gate bipolar transistor (IGBT), or a metal-oxide-semiconductor field-effect transistor (MOSFET).

* * * * *